(12) United States Patent
Kekahuna

(10) Patent No.: US 9,815,162 B1
(45) Date of Patent: Nov. 14, 2017

(54) METHOD AND APPARATUS FOR PROVIDING CUTTING FLUID IN A CNC MACHINE

(71) Applicant: Climb Tech, LLC, Austin, TX (US)

(72) Inventor: Ivan A. J. Kekahuna, Austin, TX (US)

(73) Assignee: Climb Tech, LLC, Austin, TX (US)

( * ) Notice: Subject to any disclaimer, the term of this patent is extended or adjusted under 35 U.S.C. 154(b) by 0 days.

(21) Appl. No.: 15/078,742

(22) Filed: Mar. 23, 2016

(51) Int. Cl.
*B23C 9/00* (2006.01)
*B23Q 11/10* (2006.01)
*B23B 25/00* (2006.01)

(52) U.S. Cl.
CPC .......... *B23Q 11/1084* (2013.01); *B23B 25/00* (2013.01); *B23C 9/00* (2013.01); *B23B 2250/12* (2013.01); *B23C 2250/12* (2013.01)

(58) Field of Classification Search
CPC ....... B23B 27/10; B23B 51/042; B23B 51/06; B23B 2231/24; B23B 2250/12; B23B 2270/24; B23B 2270/28; B28D 7/02; B23Q 11/1076; B23Q 11/10; B23Q 11/1061; B23Q 11/1053
See application file for complete search history.

(56) References Cited

U.S. PATENT DOCUMENTS

| | | | | |
|---|---|---|---|---|
| 2,574,744 A | * | 11/1951 | Koepke | B23Q 11/122 184/28 |
| 5,079,828 A | * | 1/1992 | Kubo | B23Q 3/1554 408/61 |
| 5,343,982 A | * | 9/1994 | Min | F16N 3/12 184/105.2 |
| 6,471,573 B1 | * | 10/2002 | Reitmeyer | B24B 5/00 451/446 |
| 6,986,651 B2 | * | 1/2006 | Whisenant | F04B 7/04 417/448 |
| 2006/0123801 A1 | * | 6/2006 | Jackson | B23B 27/10 62/52.1 |
| 2009/0129878 A1 | * | 5/2009 | Miyanaga | B28D 1/14 408/56 |
| 2011/0222976 A1 | * | 9/2011 | Uchiuzo | B23B 31/20 408/59 |
| 2012/0267451 A1 | * | 10/2012 | Ogihara | B23Q 11/1076 239/240 |
| 2012/0297948 A1 | * | 11/2012 | Kenton | B28D 7/02 83/168 |
| 2014/0154020 A1 | * | 6/2014 | Miyanaga | B28D 1/041 408/56 |
| 2016/0236351 A1 | * | 8/2016 | Kunihiro | B25J 9/1697 |
| 2017/0021469 A1 | * | 1/2017 | Sailing | B23Q 11/1076 |

* cited by examiner

*Primary Examiner* — Will Fridie, Jr.
(74) *Attorney, Agent, or Firm* — Birdwell & Janke, LLP

(57) ABSTRACT

An applicator for applying cutting fluid is mounted in a CNC machine for pre-programmed, computer controlled use as a tool.

10 Claims, 4 Drawing Sheets

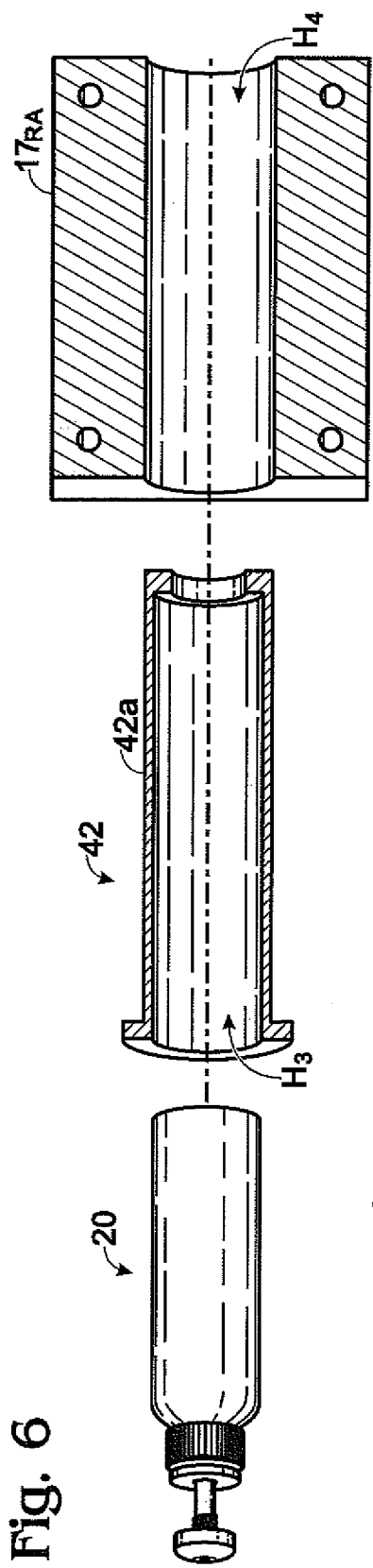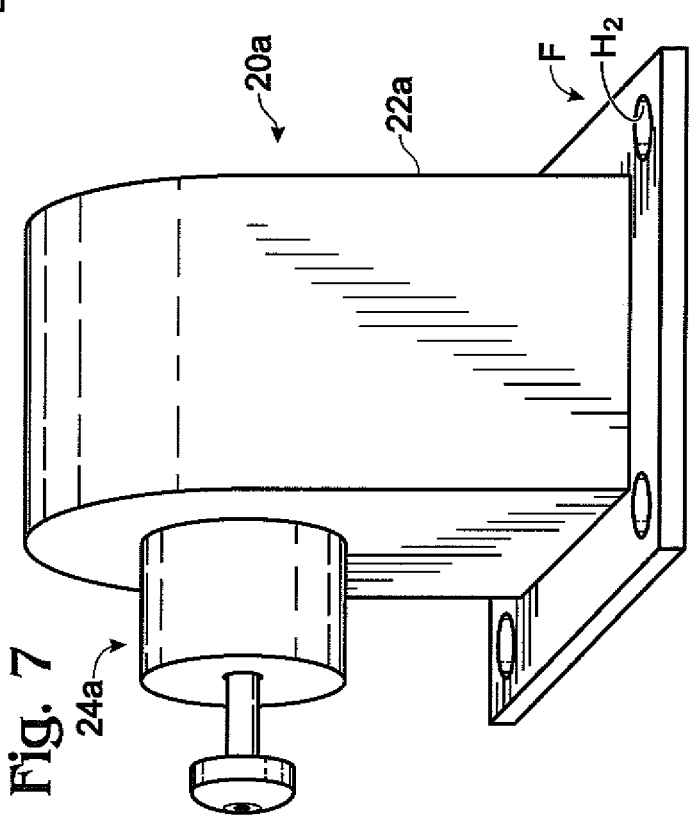

METHOD AND APPARATUS FOR PROVIDING CUTTING FLUID IN A CNC MACHINE

FIELD OF THE INVENTION

The present invention relates to providing cutting fluid in a computer numerical controlled, or "CNC," machine, such as a lathe, router or mill.

BACKGROUND

A lathe is a machine that shapes a workpiece, which may be any solid material, e.g., wood, plastic or metal, generally by turning the workpiece against stationary, changeable tools; and mills and routers are machines that shape a workpiece generally by turning changeable tools against a stationary workpiece.

Both types of machines are commonly provided with "computer numerical control," which provides for programmed control of the turning and the changing of tools, so that the workpiece can be worked with minimum operator intervention. Herein, CNC lathes, routers and mills will be referred to generically as CNC machines or CNC machining tools.

In lathes, the tool is stationary and the workpiece spins. Provision for changing tools in a CNC lathe is by use of a "turret," which is a receiver that can hold multiple tools. The turret is radially indexably motor-driven to select the desired tool, and is axially motor-driven to bring the tool against the spinning workpiece.

The tools are mounted for receipt by the turret in specialized "tool-holders" that are designed to mate the particular tool to the particular CNC machine. Such tool-holders are typically provided by the manufacturer of the CNC machine.

In standard CNC routers and mills, the workpiece is mounted to a table that is motor-driven to allow for translating the workpiece, with reference to a standard x, y, z coordinate system, in the x and y axes, and the tool spins about the z axis. Tools are again mounted in specialized tool-holders. But in this case a selected tool-holder/tool combination is removed from a library and carried to a spindle by an "automatic tool changer" or "ATC," which also removably mounts the tool-holder/tool to the spindle. The spindle is motor-driven for spinning the tool, and for translating the tool along the z axis so as to bring it into contact with the workpiece.

Some CNC lathes provide for spinning the tools as well, and can thereby perform the same operations as a CNC router or mill. In addition, some CNC machines allow for orienting and translating tools at arbitrary angles relative to the workpiece.

For machining metal workpieces formed of metal, CNC machines typically provide for continuous irrigation of the interface between the workpiece and the tool that is being used to shape the workpiece with a "cutting fluid," which is a fluid designed specifically for metalworking and machining processes, which provides for both cooling and lubricating the workpiece and the tool. The cutting fluid is recycled from a sump that typically holds 20 gallons or more of cutting fluid.

Cutting fluids are selected as a trade-off between cooling and lubricity; water-based cutting fluid providing better cooling and oil-based cutting fluid providing better lubricity. It is impractical to change the cutting fluid during the time that a workpiece is being machined; therefore, the trade-off cannot for practical purposes be optimized for each machining operation. Accordingly, when greater lubricity is needed, such as when tapping tough stainless steel, the operator of the CNC machine will typically need to intervene by stopping the machine and manually applying an alternative cutting fluid that is better suited to the particular machining operation. For example, for a tapping operation, this means manually injecting the fluid into the hole to be tapped.

SUMMARY

A method and apparatus for providing cutting fluid in a CNC machine is disclosed.

An applicator for this purpose is disclosed having a bottle portion for containing the cutting fluid, and a pumping portion. The pumping portion has a pump head and a pump body. The pump body is removably fixed to the bottle portion (such as by screw threads). The pump head is slidably received within the pump body, and has a cutting fluid discharge conduit terminating in an exit orifice on an exterior surface of the pump head. The pumping portion is adapted for pumping the cutting fluid from the bottle portion into the fluid discharge conduit for discharge out the exit orifice as a result of sliding the pump head relative to the pump body along a pumping axis, wherein the fluid discharge conduit and exit orifice are arranged so that the cutting fluid is discharged out the exit orifice substantially along the pumping axis.

A method for this purpose is disclosed which includes mounting an applicator containing the cutting fluid in the CNC machine, controlling the CNC machine to move the applicator against the workpiece along a pumping axis, and thereby discharging at least a portion of the cutting fluid onto or into the workpiece substantially along the pumping axis.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 6 is an exploded isometric view of the applicator of FIG. 2 mounted to the tool-holder of FIG. 5, with the tool-holder shown in a cross-section taken along the line 6-6 of FIG. 5. Also shown in cross-section, in the same cross-sectional plane, is an adaptor for adapting the applicator to fit the tool-holder according to the present invention.

FIG. 7 is an isometric view of an alternative cutting fluid applicator according to the present invention.

DETAILED DESCRIPTION OF PREFERRED EMBODIMENTS

Figure 1:
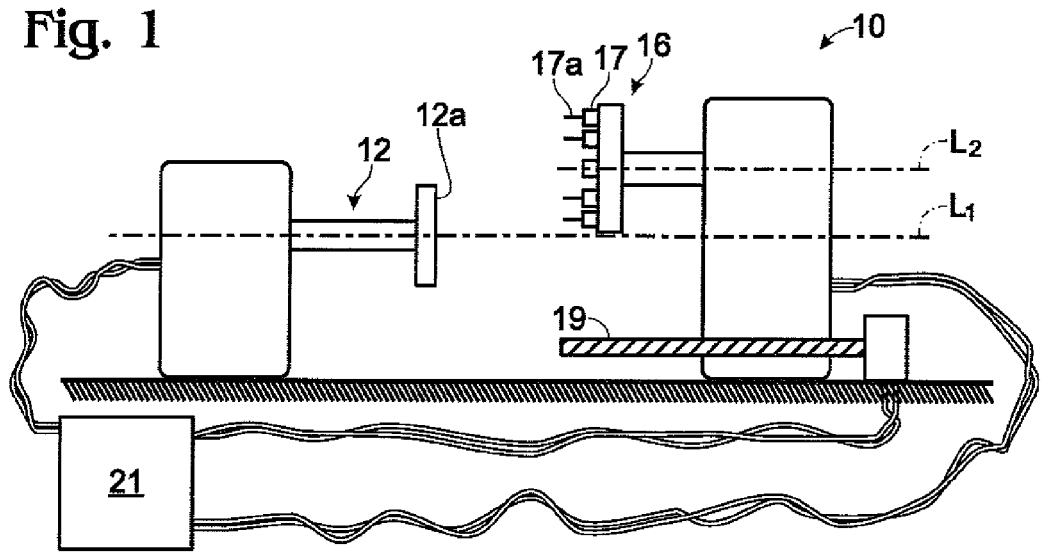
FIG. 1 is a schematic illustration of a standard CNC lathe.

FIG. 1 shows in schematic form a CNC lathe 10, as an example of a CNC machine with which the present invention may be used. The lathe 10 has a headstock spindle 12 and collet 12a for mounting a workpiece (not shown), which is connected to a motor driven headstock 14 that turns the spindle 12 about a spindle axis of rotation "$L_1$." The lathe 10 also includes a motor-driven turret 16 for turning about a turret axis "$L_2$" having a number of distinct tool-holders 17, for holding corresponding tools 17a. The tool-holders 17 are adapted to hold tools, such as cutting and drilling tools, that may be selected for application to the workpiece by indexably rotating the turret under pre-programmed control by a computer 21.

In addition, the turret is able to move or translate the tools parallel to the axis of rotation L of the spindle under pre-programmed, computer control of a motor-driven screw 19. Such movements will be referred to herein as "axial" movements.

The computer used in a CNC machine such as the lathe 10 is typically proprietary, but it may be any computer that has an input bus for entering a program of instructions, a memory for storing the instructions, a processing unit for fetching and executing the instructions, and an output bus for controlling the mechanical operations of the machine according to the instructions.

Figure 2:
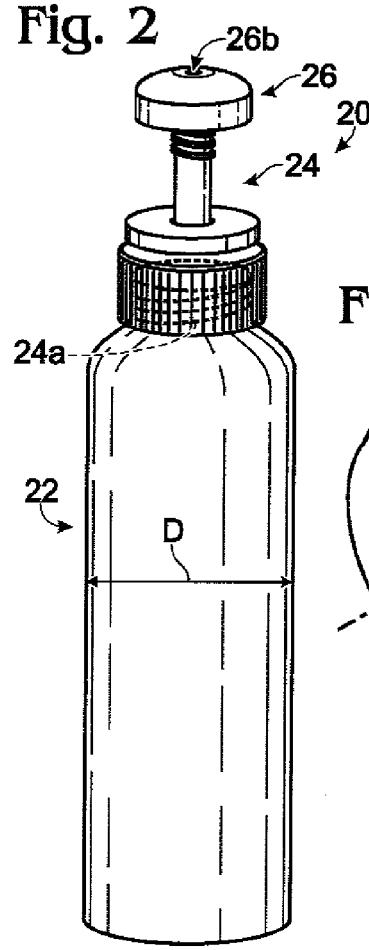
FIG. 2 is an isometric view of a cutting fluid applicator for use in the lathe of FIG. 1 according to the present invention.

FIG. 2 shows a cutting fluid applicator 20 according to the present invention. According to the invention, the cutting fluid applicator may be installed in the lathe 10 as one of the tools held by the turret 16, and may be used to apply an alternative cutting fluid stored in the applicator to the workpiece, where and when needed under pre-programmed, computer control.

The applicator typically has a bottle portion 22, the interior volume of which provides a reservoir (not shown) for holding the alternative cutting fluid, and a separable pumping portion 24 with threads 24a adapted to be threaded onto corresponding bottle threads (not shown) of the bottle portion; however, the means of attachment between the pumping and bottle portions may vary.

Figure 3:
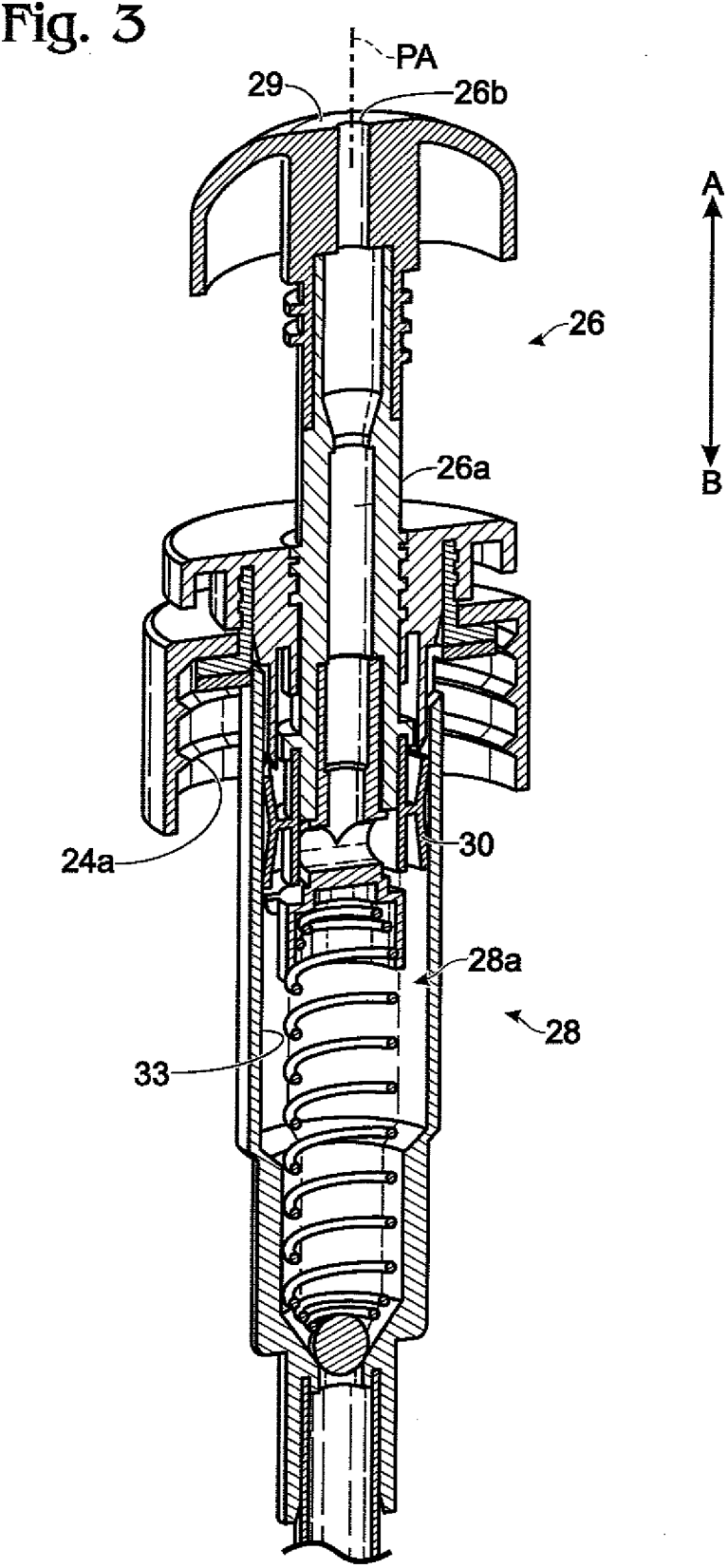
FIG. 3 is a cut-away side elevation of a typical pumping mechanism for a liquid soap, showing the position of a sleeve valve relative to a pump head and pump body as the pump head is being driven downwardly.
Figure 4:
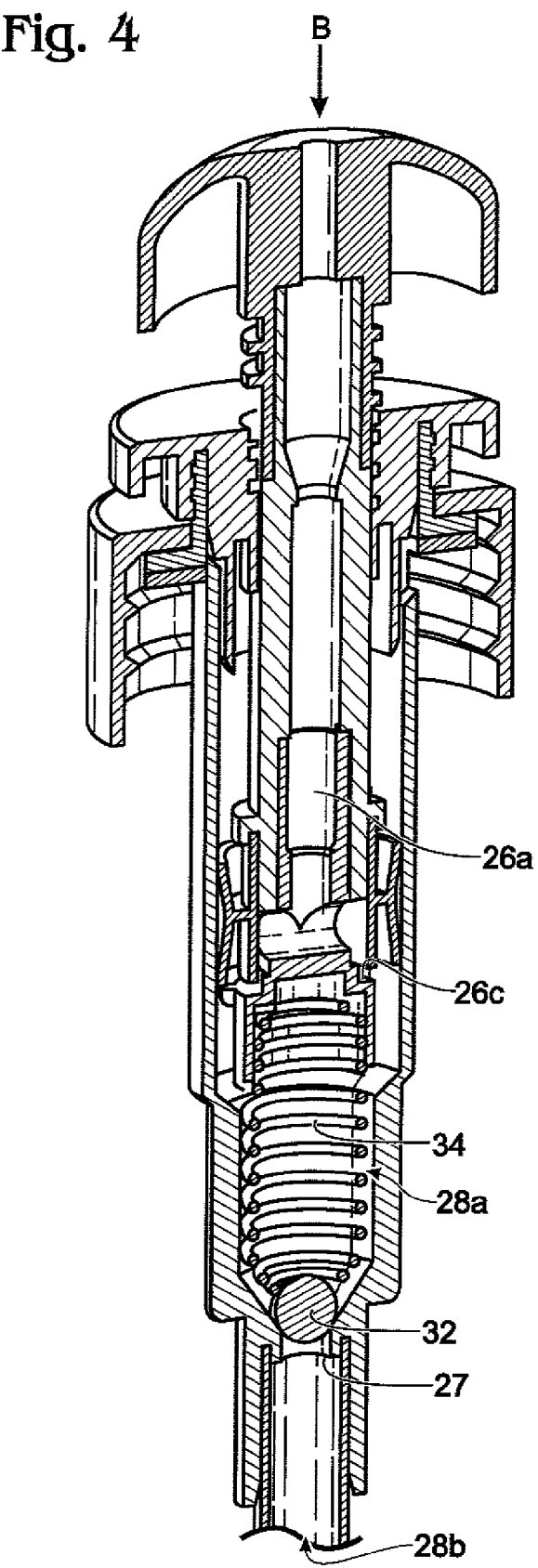
FIG. 4 is a cut-away side elevation of the pumping mechanism of FIG. 3 showing the position of the relative position of the sleeve valve as the pump head is being driven upwardly.

The applicator has a pumping mechanism that may be substantially the same as that of a standard liquid soap dispenser. FIGS. 3 and 4 show an example of such a mechanism. The pumping portion 24 has a pump head 26 slidably fitted within a pump body 28 such that the pump head 26 can move relative to the bottle portion along a "pumping axis" "PA" that is parallel to the directions indicated as "A" and "B." By such movement, the pump head 26 is capable of pumping fluid contained in the bottle portion 22 (not shown in FIGS. 3 and 4) through a fluid dispensing conduit 26a in the pump head, which terminates in an exit orifice 26b on an exterior surface 29 of the pump head, for discharging the fluid out the exit orifice.

Referring particularly to FIG. 4, to prime the applicator the pump head 26 is pressed downwardly in the direction B, which exerts a force on a ball 32 that is transmitted by a compression spring 34 so as to seal an opening 27 between a compressible/expandable fluid transfer chamber 28a, and a fluid infill conduit 28b, of the pump body 28.

Releasing the pump head 26 allows the spring 34 to drive the head upwardly in the reverse direction A, which creates a partial vacuum in the fluid transfer chamber 28a and also relaxes the spring, allowing the ball 32 to become unseated from the opening 27, and atmospheric pressure to drive fluid from the bottle portion 22 through the fluid infill conduit 28b into the fluid transfer chamber 28a.

Again with particular reference to FIG. 4, a sleeve valve 30, which frictionally engages a sidewall 33 of the fluid transfer chamber 28a and a sealing surface 26c of the pump head 26, prevents fluid from infiltrating the dispensing conduit 26a as the pump head rises.

Once the applicator is primed, pressing the head 26 downwardly a second time unseats the sleeve valve 30 from the sealing surface 26b, and fluid in the fluid transfer chamber 28a is forced into the fluid dispensing conduit 26a and discharged out the exit orifice 26b.

FIGS. 3 and 4 show, respectively, the sleeve valve 30 when the pump head 26 is being pressed downwardly in the direction B, and when it is driven to rise upwardly in the direction A by the spring 34.

The details of the pumping mechanism are not important to the invention—as noted, the pumping mechanism disclosed herein is being provided merely as an example. Alternative pumping mechanisms may be employed as desired.

The pump head 26 may, however, differ from the pump head in a standard plastic liquid soap dispenser by virtue of the fluid dispensing conduit 26a and exit orifice 26b being oriented so that fluid is discharged out the exit orifice substantially along the pumping axis PA, in the direction A.

Typically and preferably, the pump head 26 and pump body 28 are cylindrically symmetrical about a central axis and the pumping axis PA is congruent with this central axis as shown; however, this is not essential.

Figure 5:
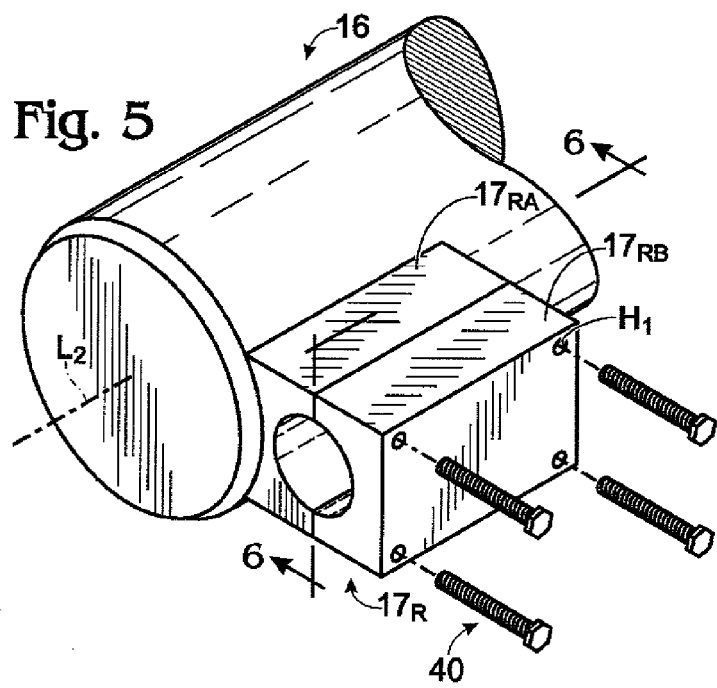
FIG. 5 is an isometric view of a tool-holder, mounted on the turret of a CNC machine, that may be used to mount the applicator of FIG. 2 in the CNC machine according to the present invention.

FIG. 5 shows the turret 16 with one standard tool-holder $17_R$, which may be used for holding the bottle portion 22 of the applicator 20 as indicated in the exploded view of FIG. 6. As seen in FIG. 5, the tool-holder $17_R$ has two half portions $17_{RA}$ and $17_{RB}$ that are both bolted together and mounted to the turret by use of bolts 40 which extend through holes "$H_1$" through the tool-holder into threaded holes (not visible in the Figure) in the turret.

The applicator 20 may be provided with an outer diameter "D" that allows for using an existing boring bar holder as a tool-holder. However, where the applicator has a size or shape that does not fit an existing tool-holder, a custom tool-holder may be provided. Alternatively, a an adaptor may be provided which is adapted for receiving the applicator, and for being received by the tool-holder. FIG. 6 shows an example of an adaptor 42, which has an applicator-holding hole "$H_3$" that is shaped and sized for snugly receiving the applicator, and an outer surface 42a that is shaped and sized for being snugly received in a tool-holding hole "$H_4$" in the tool-holder. For purposes herein, an applicator or adaptor is "snugly received" by, respectively, an adaptor or tool-holder, if the fit between the mating parts is tight enough to retain the applicator in a fixed working position on the turret or spindle during use of the applicator for applying cutting fluid to a workpiece that is being machined in a CNC machine. As will be readily apparent to persons of ordinary mechanical skill, numerous alternative means for mounting the applicator to an adaptor, and/or for mounting the adaptor to the tool-holder, may be employed. For example, the applicator could be attached to the adaptor by use of a clamp, and the adaptor could be bolted to the tool-holder.

FIG. 7 shows an alternative applicator 20a with a bottle portion 22a that provides for maximizing the volume of the internal reservoir, by eliminating the tool-holder $17_R$ and using the space that would have been occupied by the tool-holder for storing the cutting fluid. Accordingly, the applicator 20*a* has a flange portion "F" having holes "H$_2$" that correspond in size and hole-pattern to the holes H$_1$ of FIG. 5 for receiving appropriately shortened versions of the bolts 40, for mounting the applicator directly to the turret in place of the tool-holder 17$_R$.

When installed in the turret 16 of the lathe 10 so that the direction B is aligned with the axis of rotation L of the spindle 12, the axial movement provided by the turret enables the turret to bring the pump head of the applicator into contact with the workpiece, and press the pump head of the applicator against the workpiece at a point of application thereon, and thereby pump fluid onto or into the workpiece at the point of application in the same direction. This is particularly advantageous where there is a hole in the workpiece, it is desired to tap the hole, and an alternative cutting fluid to that which is being provided from the sump should be used for this operation to avoid the tap seizing in the hole.

In this example, the alternative cutting fluid may be introduced into the applicator for storage therein, such as by removing the pumping portion 24 from the bottle portion 22 and pouring the alternative cutting fluid into the bottle portion; and the computer may be programmed to instruct the lathe to perform functions such as (1) stopping the rotation of the spindle, (2) rotating the turret so as to bring the applicator into position for use, (3) axially moving the applicator so as to apply it to against the surface of the workpiece surrounding the hole, to result in discharging the alternative cutting fluid into the hole, (4) re-starting the rotation of the spindle, (5) rotating the turret again to bring a tapping tool into position for use, and (6) axially moving the tapping tool so as to insert it into the hole, resulting in tapping the hole with the aid of the alternative cutting fluid.

Extending this example to the use of applicators according to the present invention in other types of CNC machines will be straightforward to persons of ordinary skill.

Preferably, the applicator is configured to discharge cutting fluid, as measured at the exit orifice, within +/−25 degrees of the pumping axis, more preferably within +/−15 degrees, more preferably still within +/−10 degrees, and most preferably within +/−5 degrees.

While it is preferable that the pump head of the applicator is adapted to discharge the cutting fluid in the same direction that the applicator is moved into position against the workpiece, this is not essential.

It is to be understood that, while specific methods and apparatus have been shown and described as preferred, variations could be made without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A combination CNC machine and applicator for providing cutting fluid to a workpiece in the CNC machine, the CNC machine having a tool-holder with a plurality of tool-holding holes adapted for holding a plurality of tools for use by the CNC machine, the combination comprising:
    a CNC machine;
    a bottle portion for containing the cutting fluid, wherein either the bottle portion is adapted for snugly fitting in one of the tool-holding holes, or the combination further comprises an adaptor having an applicator-holding hole adapted for snugly receiving the bottle portion and the adaptor is adapted for snugly fitting in one of the tool-holding holes; and
    a pumping portion having a pump head and a pump body, the pump body removably fixed to the bottle portion, the pump head slidably received within the pump body, the pump head having a cutting fluid discharge conduit terminating in an exit orifice on an exterior surface of the pump head, the pumping portion adapted for pumping the cutting fluid from the bottle portion into the fluid discharge conduit for discharge out the exit orifice as a result of sliding the pump head relative to the pump body along a pumping axis, wherein the fluid discharge conduit and exit orifice are arranged so that the cutting fluid is discharged out the exit orifice substantially along the pumping axis.

2. The combination CNC machine and applicator of claim 1, wherein the pump head and pump body are cylindrically symmetrical about a central axis, and wherein the pumping axis is congruent with the central axis.

3. A method for providing cutting fluid to a workpiece in a CNC machine having a tool-holder, the tool-holder having a plurality of tool-holding holes adapted for holding a plurality of tools for use by the CNC machine, the method comprising:
    disposing an applicator containing a first quantity of the cutting fluid in the tool-holder;
    controlling the CNC machine to remove the applicator from the tool-holder and move the applicator against the workpiece along a pumping axis, thereby causing the applicator to discharge a second quantity of the cutting fluid onto or into the workpiece.

4. The method of claim 3, wherein the applicator is caused to discharge the second quantity of cutting fluid substantially along the pumping axis.

5. The method of claim 4, wherein said step of mounting the applicator in the CNC machine includes mounting the applicator directly to a turret or spindle of the CNC machine.

6. The method of claim 4, wherein said step of mounting the applicator in the CNC machine includes mounting a tool-holder directly to a turret or spindle of the CNC machine, and mounting the applicator to the tool-holder.

7. The method of claim 6, wherein said step of mounting the applicator to the tool-holder includes mounting the applicator to an adaptor and mounting the adaptor to the tool-holder.

8. The method of claim 3, wherein said step of mounting the applicator in the CNC machine includes mounting the applicator directly to a turret or spindle of the CNC machine.

9. The method of claim 3, wherein said step of mounting the applicator in the CNC machine includes mounting a tool-holder directly to a turret or spindle of the CNC machine, and mounting the applicator to the tool-holder.

10. The method of claim 9, wherein said step of mounting the applicator to the tool-holder includes mounting the applicator to an adaptor and mounting the adaptor to the tool-holder.

* * * * *